(12) United States Patent
Pollett (10) Patent No.: US 9,944,064 B2
(45) Date of Patent: Apr. 17, 2018

(54) METHOD FOR FORMING AN IMPELLER HOUSING FOR AN APPLIANCE

(71) Applicant: General Electric Company, Schenectady, NY (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 488 days.

(21) Appl. No.: 14/512,534

(22) Filed: Oct. 13, 2014

(65) Prior Publication Data

US 2016/0101569 A1    Apr. 14, 2016

(51) Int. Cl.
*B33Y 10/00*    (2015.01)
*B29C 67/00*    (2017.01)
*B33Y 80/00*    (2015.01)
*B29L 31/00*    (2006.01)

(52) U.S. Cl.
CPC .......... *B33Y 10/00* (2014.12); *B29C 67/0051* (2013.01); *B33Y 80/00* (2014.12); *B29L 2031/762* (2013.01)

(58) Field of Classification Search
CPC .................................................. B29C 67/0051
See application file for complete search history.

(56) References Cited

U.S. PATENT DOCUMENTS

| 5,314,003 | A | * | 5/1994 | Mackay | B22D 23/06 164/250.1 |
| 5,989,664 | A | * | 11/1999 | Takayama | B29C 67/0062 29/888.046 |
| 7,312,269 | B2 | | 12/2007 | Cevolini | |
| 8,286,236 | B2 | | 10/2012 | Jung et al. | |
| 2006/0013707 | A1 | * | 1/2006 | Oklejas | F01D 15/08 417/407 |
| 2013/0263854 | A1 | * | 10/2013 | Taylor | A61M 16/0066 128/204.23 |

FOREIGN PATENT DOCUMENTS

CN    103287191 A    9/2013

* cited by examiner

*Primary Examiner* — Ryan Ochylski
(74) *Attorney, Agent, or Firm* — Dority & Manning, P.A.

(57) ABSTRACT

A method for forming an impeller housing for an appliance is provided. The method includes establishing three-dimensional information of the impeller housing, converting the three-dimensional information of the impeller housing into a plurality of slices, and successively forming each cross-sectional layer of the impeller housing with an additive process. The additive process may permit formation of various features of the impeller housing.

17 Claims, 6 Drawing Sheets

METHOD FOR FORMING AN IMPELLER HOUSING FOR AN APPLIANCE

FIELD OF THE INVENTION

The present subject matter relates generally to impeller housings for appliances, such as dryer appliances.

BACKGROUND OF THE INVENTION

Dryer appliances generally include a cabinet with a drum rotatably mounted therein. A motor can selectively rotate the drum during operation of the dryer appliance, e.g., to tumble articles located within a chamber defined by the drum. Dryer appliances also generally include a heater assembly that passes heated air through the chamber of the drum in order to dry moisture laden articles disposed within the chamber.

To circulate heated air, certain dryer appliances include an impeller positioned within a housing. During operation of the dryer appliance, the impeller urges a flow of heated air into the chamber of the drum. Such heated air absorbs moisture from articles disposed within the chamber. The impeller also urges moisture laden air out of the chamber through a vent. The vent can be connected to household ductwork that directs the moisture laden air outdoors.

Performance of a dryer appliance can be affected by the flow of heated air. For example, dryer appliance performance can be improved by generating a large volume of heated air. Conversely, dryer appliance performance can be negatively affected if the heating assembly generates a low volume of heated air.

To improve dryer performance, a size of the impeller can be increased. However, space with a dryer appliance is generally limited or constrained. Thus, increasing a size of the impeller can be difficult. To improve dryer performance, certain dryer appliances include a second motor configured to rotate the impeller. However, motors can be expensive, and adding the second motor to the dryer appliance can increase the cost of the dryer appliance.

Accordingly, a dryer appliance with features for improving air flow through the dryer appliance would be useful. In particular, a dryer appliance with features for improving air flow through the dryer appliance without requiring a relatively large impeller or adding a second motor to the dryer appliance would be useful. Methods for making housings for impellers of dryer appliances that improve air flow through the dryer appliance would also be useful.

BRIEF DESCRIPTION OF THE INVENTION

The present subject matter provides a method for forming an impeller housing for an appliance. The method includes establishing three-dimensional information of the impeller housing, converting the three-dimensional information of the impeller housing into a plurality of slices, and successively forming each cross-sectional layer of the impeller housing with an additive process. The additive process may permit formation of various features of the impeller housing. Additional aspects and advantages of the invention will be set forth in part in the following description, or may be apparent from the description, or may be learned through practice of the invention.

In a first exemplary embodiment, a method for forming a unitary housing for an impeller of a dryer appliance is provided. The method includes establishing three-dimensional information of the unitary housing and converting the three-dimensional information of the unitary housing from said step of establishing into a plurality of slices. Each slice of the plurality of slices defines a respective cross-sectional layer of the unitary housing. The method also includes successively forming each cross-sectional layer of the unitary housing with an additive process. After the step of successively forming: (1) the unitary housing has a transition duct extending between a volute of the unitary housing and an exhaust exit of the unitary housing; (2) the transition duct has an inlet cross-section immediately downstream of the volute of the unitary housing and an outlet cross-section at the exhaust exit of the unitary housing; (3) the inlet cross-section has a curvilinear trapezoidal shape; (4) the outlet cross-section has a circular shape; and (5) the transition duct continuously varies from the inlet cross-section to the outlet cross-section along a length of the transition duct.

In a second exemplary embodiment, a method for forming a unitary housing for an impeller of a dryer appliance is provided. The method includes establishing three-dimensional information of the unitary housing and converting the three-dimensional information of the unitary housing from said step of establishing into a plurality of slices. Each slice of the plurality of slices defines a respective cross-sectional layer of the unitary housing. The method also includes successively forming each cross-sectional layer of the unitary housing with an additive process. After the step of successively forming: (1) the unitary housing has a cylindrical portion configured for receiving the impeller; (2) the cylindrical portion has a volute; (3) the unitary housing has a transition duct extending between the volute of the cylindrical portion and an exhaust exit; (4) the transition duct has an inlet cross-section immediately downstream of the volute of the cylindrical portion and an outlet cross-section at the exhaust exit; (5) the inlet cross-section has a different shape than the outlet cross-section; and (6) cross-sections of the transition duct continuously vary from the inlet cross-section to the outlet cross-section along a length of the transition duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to but need not be limited to fabrics, textiles, garments (or clothing), and linens. Furthermore, the term "load" or "laundry load" refers to the combination of articles that may be washed together in a washing machine or dried together in a laundry dryer (i.e., a clothes dryer) and may include a mixture of different or similar articles of different or similar types and kinds of fabrics, textiles, garments and linens within a particular laundering process.

Figure 1:
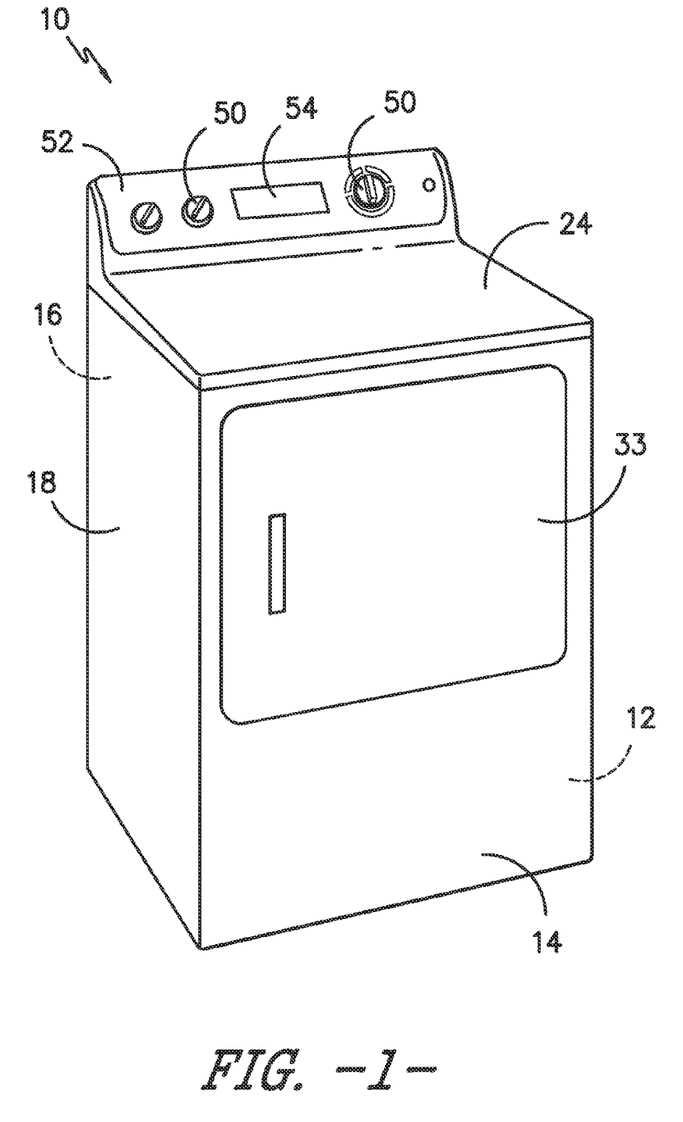
FIG. 1 provides a perspective view of a dryer appliance according to an exemplary embodiment of the present subject matter.
Figure 2:
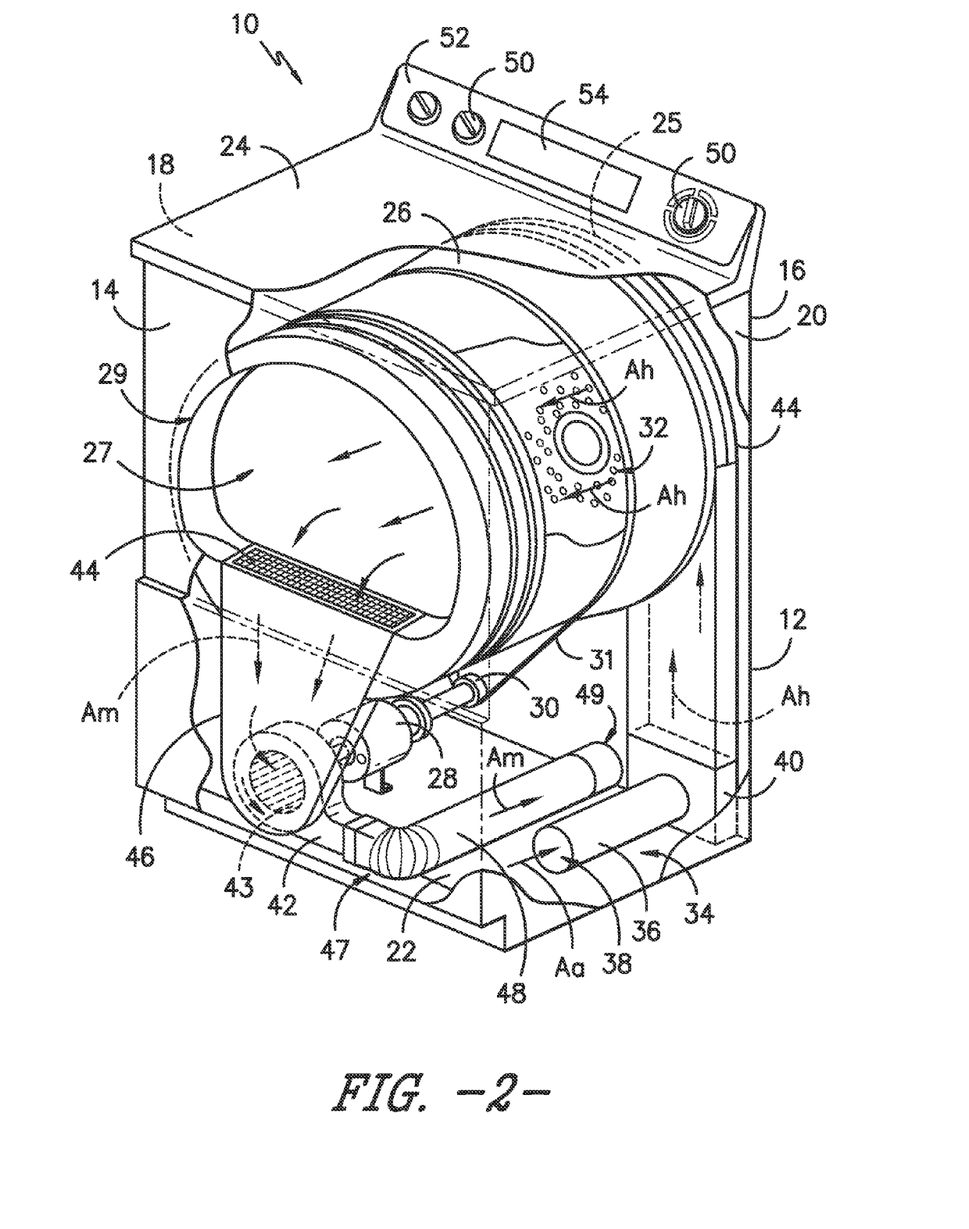
FIG. 2 provides a perspective view of the exemplary dryer appliance of FIG. 1 with a portion of a cabinet of the exemplary dryer appliance removed to reveal certain internal components of the exemplary dryer appliance.

FIGS. 1 and 2 illustrate a dryer appliance 10 according to an exemplary embodiment of the present subject matter. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well. For example, dryer appliance 10 illustrated in FIGS. 1 and 2 is a gas dryer appliance with a combustion chamber 36. In alternative exemplary embodiments, dryer appliance 10 may be an electric dryer appliance with electric heating elements replacing combustion chamber 36.

Dryer appliance 10 includes a cabinet 12 having a front panel 14, a rear panel 16, a pair of side panels 18 and 20 spaced apart from each other by front and rear panels 14 and 16, a bottom panel 22, and a top cover 24. Within cabinet 12 is a drum or container 26 mounted for rotation about a substantially horizontal axis. Drum 26 is generally cylindrical and defines a chamber 27 for receipt of damp articles.

Drum 26 also defines an opening 29 for permitting access to the chamber 27 of drum 26. Opening 29 of drum 26, e.g., permits loading and unloading of clothing articles and other fabrics from chamber 27 of drum 26. A door 33 is rotatably mounted at opening 29 and selectively hinders access to chamber 27 of drum 26 through opening 29.

Drum 26 includes a rear wall 25 rotatably supported within cabinet 12 by a suitable fixed bearing. Rear wall 25 can be fixed or can be rotatable. A motor 28 rotates the drum 26 about the horizontal axis through a pulley 30 and a belt 31. Motor 28 is also in mechanical communication with a fan or air handler 42 such that motor 28 rotates an impeller 43, e.g., a centrifugal impeller, of air handler 42. Air handler 42 is configured for drawing air through chamber 27 of drum 26, e.g., in order to dry articles located therein as discussed in greater detail below. In alternative exemplary embodiments, dryer appliance 10 may include an additional motor (not shown) for rotating impeller 43 of air handler 42 independently of drum 26.

Drum 26 is configured to receive heated air that has been heated by a heater assembly 34, e.g., in order to dry damp articles disposed within chamber 27 of drum 26. Heater assembly 34 includes a combustion chamber 36. As discussed above, during operation of dryer appliance 10, motor 28 rotates drum 26 and impeller 43 of air handler 42 such that air handler 42 draws air through chamber 27 of drum 26 when motor 28 rotates impeller 43. In particular, ambient air, shown with arrow $A_a$, enters combustion chamber 36 via an inlet 38 due to air handler 42 urging such ambient air $A_a$ into inlet 38. Such ambient air $A_a$ is heated within combustion chamber 36 and exits combustion chamber 36 as heated air, shown with arrow $A_h$. Air handler 42 draws such heated air $A_h$ through a back duct 40 to drum 26. The heated air $A_h$ enters drum 26 through a plurality of holes 32 defined in rear wall 25 of drum 26.

Within chamber 27, the heated air $A_h$ can accumulate moisture, e.g., from damp articles disposed within chamber 27. In turn, air handler 42 draws moisture laden air, shown as arrow $A_m$, through a screen filter 44 which traps lint particles. Such moisture laden air Am then enters a front duct 46 and is passed through air handler 42 to an exhaust duct 48. From exhaust duct 48, such moisture laden air Am passes out of clothes dryer 10 through a vent 49 defined by cabinet 12.

Front duct 46 and exhaust duct 48 form a conduit 47 that extends between and connects chamber 27 of drum 26 and vent 49. Conduit 47 places chamber 27 of drum 26 and vent 49 in fluid communication in order to permit moisture laden air $A_m$ to exit dryer appliance 10. Air handler 42 is in fluid communication with conduit 47, and impeller 43 of air handler 42 is positioned within conduit 47.

A cycle selector knob 50 is mounted on a cabinet backsplash 52 and is in communication with a controller 54. Signals generated in controller 54 operate motor 28 and heater assembly 34 in response to a position of selector knob 50. Alternatively, a touch screen type interface may be provided. As used herein, "processing device" or "controller" may refer to one or more microprocessors or semiconductor devices and is not restricted necessarily to a single element. The processing device can be programmed to operate dryer appliance 10. The processing device may include, or be associated with, one or memory elements such as e.g., electrically erasable, programmable read only memory (EEPROM).

Figure 3:
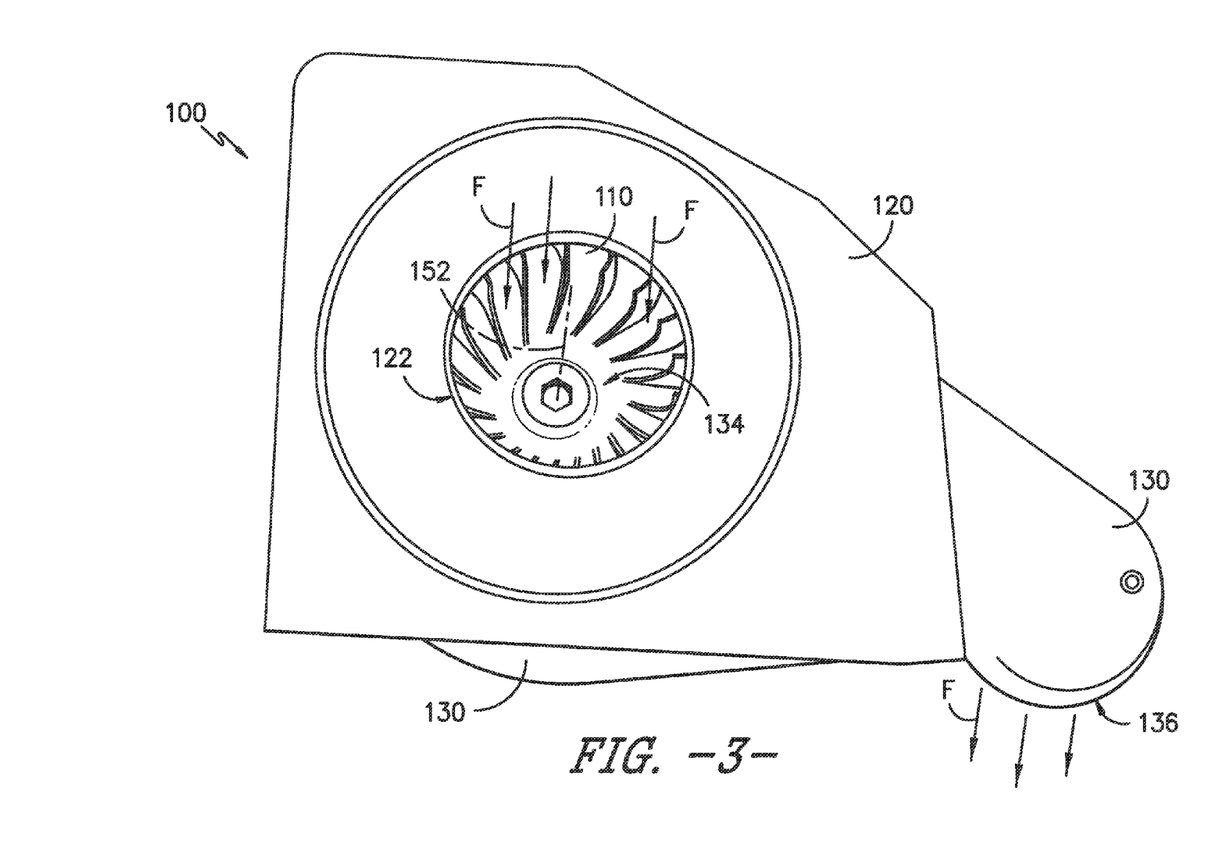
FIG. 3 provides a perspective view of an impeller assembly according to an exemplary embodiment of the present subject matter.

FIG. 3 provides a perspective view of an impeller assembly 100 according to an exemplary embodiment of the present subject matter. Impeller assembly 100 may be used in any suitable dryer appliance. For example, impeller assembly 100 may be used in dryer appliance 10, e.g., as air handler 42 (FIG. 2). Thus, impeller assembly 100 may be positioned within cabinet 12, e.g., at front duct 46, such that impeller assembly 100 draws and receives moisture laden air $A_m$ from chamber 27 of drum 26. As discussed in greater detail below, impeller assembly 100 includes features for limiting a pressure reduction or drop for a flow of air F through impeller assembly 100. Performance of dryer appliance 10 may be improved by limiting the pressure drop for the flow of air F through impeller assembly 100, as will be understood by those skilled in the art.

As may be seen in FIG. 3, impeller assembly 100 includes an impeller 110, a cover plate 120 and a housing 130. Impeller 110 is positioned within housing 130. Impeller 110 may be placed in mechanical communication with a motor, such as motor 28, that selectively rotates impeller 110 about an axis of rotation 152 within housing 130. For example, impeller 110 may be fixed to a shaft of motor 28 such that impeller 110 rotates about the axis of rotation 152 within housing 130 with motor 28.

Cover plate 120 is mounted to housing 130. Cover plate 120 defines an entrance 122 for receiving the flow of air F into housing 130. Housing 130 also defines an exhaust exit 136 for directing the flow of air F out of housing 130. As an example, during operation of impeller assembly 100, impeller 110 may rotate on the axis of rotation 152 within housing 130 such that impeller 110 draws the flow of air F into housing 130 via entrance 122 of cover plate 120. In addition, impeller 110 may urge the flow of air F through housing 130 to exhaust exit 136 of housing 130 during operation of impeller assembly 100. In such a manner, impeller 110 may urge or draw the flow of air F through housing 130 during operation of impeller assembly 100.

Figure 4:
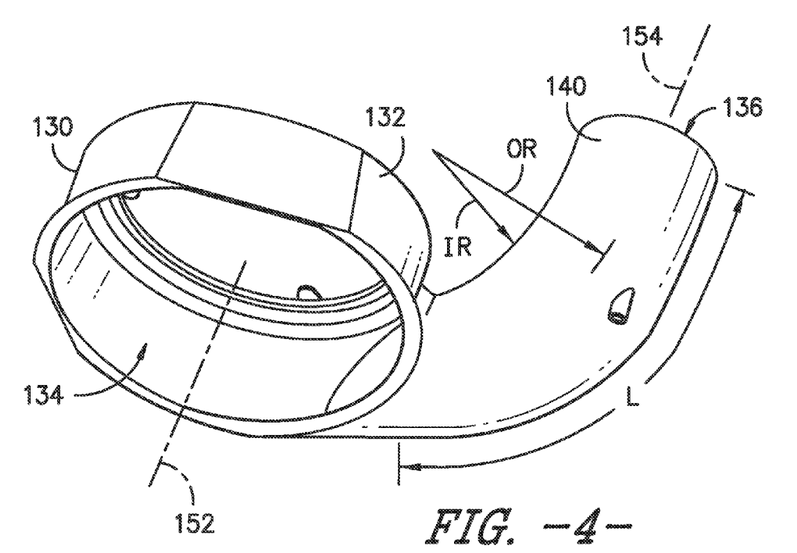
FIG. 4 provides a perspective view of a housing of the exemplary impeller assembly of FIG. 3.
Figure 5:
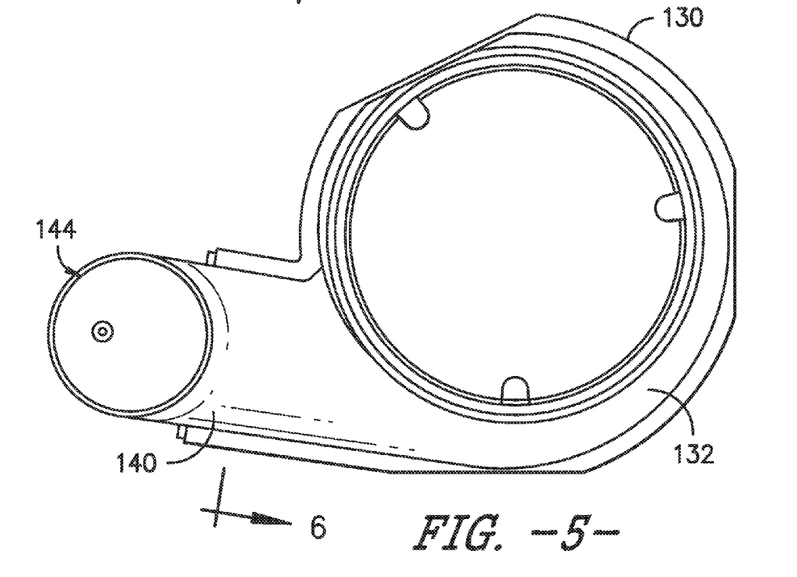
FIG. 5 provides a rear, elevation view of the housing of the exemplary impeller assembly of FIG. 3.
Figure 6:
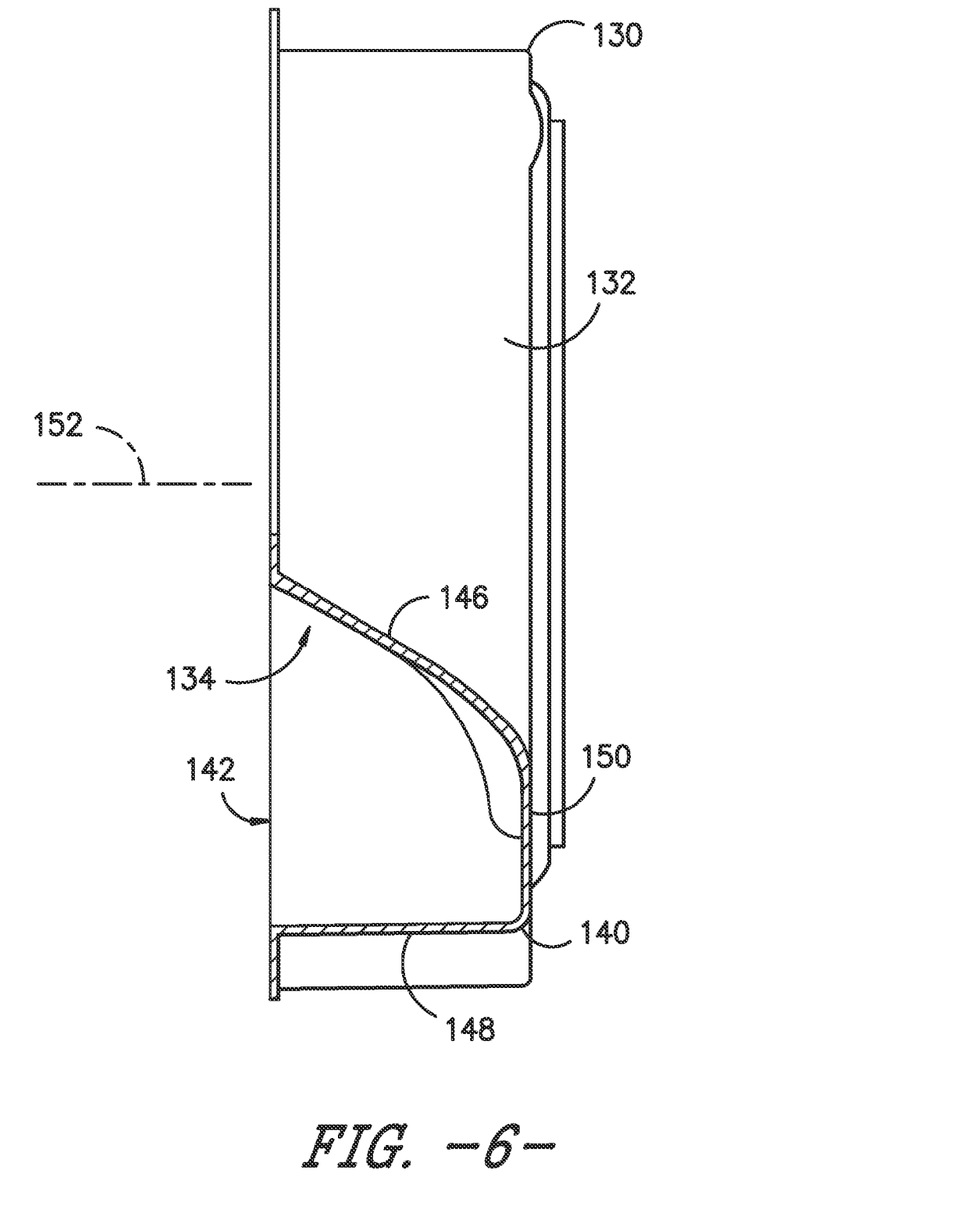
FIG. 6 provides a section view of the housing of the exemplary impeller assembly of FIG. 5 taken along the 6-6 line of FIG. 5.

FIG. 4 provides a perspective view of housing 130. FIG. 5 provides a rear, elevation view of housing 130. FIG. 6 provides a section view of impeller assembly 100 taken along the 6-6 line of FIG. 5. As may be seen in FIG. 4, housing 130 includes a cylindrical portion 132 and a transition duct 140. Cylindrical portion 132 defines a volute 134 of housing 130 that is sized and configured for receiving impeller 110. Thus, impeller 110 may be positioned within cylindrical portion 132, e.g., at volute 134 of cylindrical portion 132. Transition duct 140 extends between volute 134 of cylindrical portion 132 and exhaust exit 136, e.g., in an L-shape. Exhaust exit 136 defines an exit axis 154. The flow of air F exits housing 130 at exhaust conduit 136 flowing along a direction that is parallel to exit axis 154. As may be seen in FIG. 4, exit axis 154 may be substantially parallel to the axis of rotation 152. The flow of air F may flow into housing 130 flowing along a direction that is parallel to the axis of rotation 152. Within volute 134 of cylindrical portion 132, the flow of air F may be urged radially outward from the axis of rotation 152, e.g., along directions that are perpendicular to the axis of rotation 152. Transition duct 140 may redirect or turn the flow of air F within housing 130, e.g., such that the flow of air F enters and exits housing 130 along directions that are parallel to each other.

As discussed above, housing 130 may be positioned within cabinet 12 of dryer appliance 10. As an example, housing 130 may be positioned within cabinet 12 at front duct 42. Entrance 122 of cover plate 120 may be positioned for receiving moisture laden air $A_m$ from front duct 42. In addition, cover plate 120 (FIG. 3) may be mounted to cylindrical portion 132 and positioned over volute 134 of cylindrical portion 132. Entrance 122 of cover plate 120 may also be positioned for directing the flow of air F into volute 134 of cylindrical portion 132. The flow of air F flows through housing 130 from volute 134 of cylindrical portion 132 to exhaust exit 136. From exhaust exit 136, the flow of air F exits housing 130. In dryer appliance 10, exhaust duct 48 may extend between and fluidly couple exhaust exit 136 of housing 130 and vent 49 of cabinet 12.

Housing 130 may be constructed of or with any suitable material. For example, housing 130 may be constructed of or with a single continuous or integral piece of plastic. In particular, cylindrical portion 132 of housing 130 and transition duct 140 of housing 130 may be constructed of a single continuous or integral piece of plastic. Cover plate 120 may also be constructed of or with any suitable material. For example, cover plate 120 may be constructed of a metal, such as steel.

As discussed above, transition duct 140 extends between volute 134 of cylindrical portion 132 and exhaust exit 136. Turning now to FIG. 6, transition duct 140 has an inlet cross-section 142. Inlet cross-section 142 is positioned immediately downstream of volute 134 of cylindrical portion 132. Thus, the flow of air F may enter transition duct 140 at inlet cross-section 142. Turning back to FIG. 5, transition duct 140 also has an outlet cross-section 144. Outlet cross-section 144 is positioned at or adjacent exhaust exit 136 of housing 130. The flow of air F may exit transition duct 140 at outlet cross-section 144.

As may be seen in FIG. 6, inlet cross-section 142 has a curvilinear trapezoidal shape. Inlet cross-section 142 is defined by at least at least three (or four) walls of transition duct 140, and at least one of the three walls is curved or non-linear. In the exemplary embodiment shown in FIG. 6, inlet cross-section 142 is defined by a curved upper wall 146, a linear bottom wall 148 and a linear sidewall 150 (or pair of linear sidewalls 150) of transition duct 140. Curved upper wall 146 is positioned at a top of transition duct 140, and linear bottom wall 148 is positioned below curved upper wall 146 at a bottom of transition duct 140. Linear sidewall 150 extends, e.g., vertically between curved upper wall 146 and linear bottom wall 148. In particular, linear sidewall 150 connects and/or couples curved upper wall 146 and linear bottom wall 148 together. Cover plate 120 may form the other side of inlet cross-section 142 opposite linear sidewall 150. It should be understood that inlet cross-section 142 may have other suitable shape in alternative exemplary embodiments. For example, inlet cross-section 142 may have a rectangular, circular or ovular shape.

As may be seen in FIG. 5, outlet cross-section 144 has a circular shape, e.g., having a diameter of about (e.g., within ten percent of) four inches. Thus, inlet cross-section 142 and outlet cross-section 144 have different shapes. In alternative exemplary embodiments, outlet cross-section 144 may have a different shape, such as a rectangular or ovular shape. Transition duct 140 is shaped to transition from inlet cross-section 142 and outlet cross-section 144 along a length L (FIG. 4) of transition duct 140. In particular, transition duct 140 continuously varies from inlet cross-section 142 to outlet cross-section 144 along the length L of transition duct 140. Thus, cross-sections of transition duct 140 continuously taper or shift from inlet cross-section 142 to outlet cross-section 144 along the length of transition duct 140, e.g., such that each cross-section of transition duct 140 along the length L of transition duct 140 is dissimilar to or different than an adjacent cross-section of transition duct 140, such as an immediately upstream or downstream cross-section of transition duct 140. As an example, an area or perimeter of each cross-section of transition duct 140 along the length L of transition duct 140 may be less than five percent or less than three percent different than the adjacent cross-section of transition duct 140 per each millimeter or centimeter of the length L of transition duct 140.

By gradually or continuously shifting from inlet cross-section 142 to outlet cross-section 144 in an iterative or smooth manner along the length L of transition duct 140, transition duct 140 redirects the flow of air F, e.g., to the exit axis 154, without a significant or drastic pressure reduction within transition duct 140. Thus, an efficiency of drier appliance 10 may be improved with impeller assembly 100. In particular, the efficiency of drier appliance 10 may be improved without increasing the size of impeller 110 and/or increasing the speed of impeller 110.

As discussed above, the flow of air F may be redirected ninety degrees within transition duct 140. Turning back to FIG. 4, transition duct 140 defines an inner radius of curvature IR and an outer radius of curvature OR, e.g., between inlet cross-section 142 to outlet cross-section 144. The inner radius of curvature IR may be any suitable radius. For example, the inner radius of curvature IR may be greater than two inches, greater than four inches, etc. The outer radius of curvature OR may also be any suitable radius. For example, the outer radius of curvature OR may be greater than four inches, greater than six inches, greater than eight inches, etc. The inner radius of curvature IR and outer radius of curvature OR may be defined by opposite sidewalls of transition duct 140, e.g., as transition duct 140 turns ninety degrees between inlet cross-section 142 and outlet cross-section 144. The inner radius of curvature IR and the outer radius of curvature OR may also assist with redirecting the flow of air F, e.g., to the exit axis 154, without a significant or drastic pressure reduction within transition duct 140, as discussed above.

Figure 7:
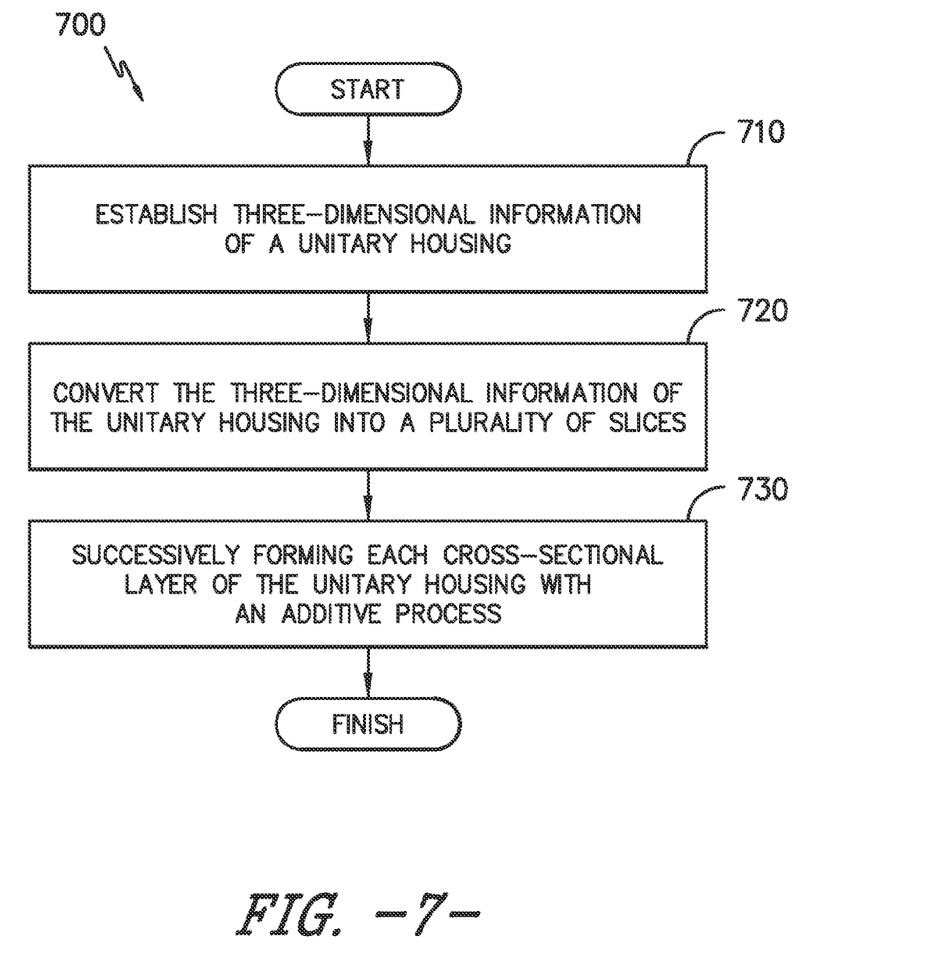
FIG. 7 illustrates a method for forming a housing of an impeller assembly according to an exemplary embodiment of the present subject matter.

FIG. 7 illustrates a method 700 for forming a housing of an impeller assembly according to an exemplary embodiment of the present subject matter. Method 700 may be used to form any suitable housing. For example, method 700 may be used to form housing 130 of impeller assembly 100 (FIG. 3). Method 700 permits formation of various features of housing 130, as discussed in greater detail below. Method 700 includes fabricating housing 130 as a unitary housing, e.g., such that housing 130 is formed of a single continuous piece of plastic or other suitable material. More particularly, method 700 includes manufacturing or forming housing 130 using an additive process, such as Fused Deposition Modeling (FDM), Selective Laser Sintering (SLS), Stereolithography (SLA), Digital Light Processing (DLP) and other known processes. An additive process fabricates plastic components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 710, three-dimensional information of housing 130 is determined. As an example, a model or prototype of housing 130 may be scanned to determine the three-dimensional information of housing 130 at step 130. As another example, a model of housing 130 may be constructed using a suitable CAD program to determine the three-dimensional information of housing 130 at step 130. At step 720, the three-dimensional information is converted into a plurality of slices that each define a cross-sectional layer of housing 130. As an example, the three-dimensional information from step 710 may be divided into equal sections or segments, e.g., along the axis of rotation 152 of housing 130 or any other suitable axis. Thus, the three-dimensional information from step 710 may be discretized at step 720, e.g., in order to provide planar cross-sectional layers of housing 130.

After step 720, housing 130 is fabricated using the additive process, or more specifically each layer is successively formed at step 730, e.g., by fusing or polymerizing a plastic using laser energy or heat. The layers may have any suitable size. For example, each layer may have a size between about five ten-thousandths of an inch and about one thousandths of an inch. Housing 130 may be fabricated using any suitable additive manufacturing machine as step 730. For example, any suitable laser sintering machine, inkjet printer or laserjet printer may be used at step 730.

Utilizing method 700, housing 130 may have fewer components and/or joints than known housings. Specifically, housing 130 may require fewer components because housing 130 may be a single piece of continuous plastic, e.g., rather than multiple pieces of plastic joined or connected together. Also, the shape and contour of transition duct 140 described above may be formed using method 700. As a result, housing 130 may provide improved flow through transition duct 140, e.g., by reducing restriction through transition duct 140. Also, housing 130 may be less prone to leaks and/or be stronger when formed with method 700.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a unitary housing for an impeller of a dryer appliance, comprising:
    establishing three-dimensional information of the unitary housing;
    converting the three-dimensional information of the unitary housing from said step of establishing into a plurality of slices, each slice of the plurality of slices defining a respective cross-sectional layer of the unitary housing; and
    successively forming each cross-sectional layer of the unitary housing with an additive process;
    wherein, after said step of successively forming: (1) the unitary housing has a transition duct extending between a volute of the unitary housing and an exhaust exit of the unitary housing; (2) the transition duct has an inlet cross-section immediately downstream of the volute of the unitary housing and an outlet cross-section at the exhaust exit of the unitary housing; (3) the inlet cross-section has a curvilinear trapezoidal shape; (4) the outlet cross-section has a circular shape; (5) the transition duct continuously varies from the inlet cross-section to the outlet cross-section along a length of the transition duct; (6) each of the cross-sections of the transition duct vary less than five percent per millimeter from an adjacent cross-section of the transition duct along the length of the transition duct from the inlet cross-section to the outlet cross-section; and (7) the inlet cross-section of the transition duct comprises a curved upper wall, a linear bottom wall and a pair of parallel linear sidewalls with the linear sidewalls of the pair of parallel linear sidewalls extending between and connecting the curved upper wall and the linear bottom wall and with the linear bottom wall oriented perpendicular to the pair of parallel linear sidewalls.

2. The method of claim 1, wherein the additive process comprises at least one of fused deposition modeling, selective laser sintering, stereolithography, and digital light processing.

3. The method of claim 1, further comprising mounting a cover plate to the unitary housing such that the cover plate is positioned over the volute of the unitary housing and the inlet cross-section of the transition duct after said step of successively forming.

4. The method of claim 3, wherein the cover plate defines an entrance for receiving a flow of air into the volute of the housing.

5. The method of claim 3, wherein the housing is constructed of plastic and the cover plate is constructed of metal.

6. The method of claim 1, wherein the transition duct defines an inner radius of curvature and an outer radius of curvature between the inlet cross-section to the outlet cross-section after said step of successively forming, the inner radius of curvature being at least two inches and the outer radius of curvature being at least four inches.

7. The method of claim 6, wherein the inner radius of curvature is at least four inches and the outer radius of curvature is at least eight inches.

8. The method of claim 1, wherein the unitary housing comprises a single continuous piece of plastic after said step of successively forming.

9. A method for forming a unitary housing for an impeller of a dryer appliance, comprising:
- establishing three-dimensional information of the unitary housing;
- converting the three-dimensional information of the unitary housing from said step of establishing into a plurality of slices, each slice of the plurality of slices defining a respective cross-sectional layer of the unitary housing; and
- successively forming each cross-sectional layer of the unitary housing with an additive process;
- wherein, after said step of successively forming: (1) the unitary housing has a cylindrical portion configured for receiving the impeller; (2) the cylindrical portion has a volute; (3) the unitary housing has a transition duct extending between the volute of the cylindrical portion and an exhaust exit; (4) the transition duct has an inlet cross-section immediately downstream of the volute of the cylindrical portion and an outlet cross-section at the exhaust exit; (5) the inlet cross-section has a different shape than the outlet cross-section; (6) cross-sections of the transition duct continuously vary from the inlet cross-section to the outlet cross-section along a length of the transition duct; (7) each of the cross-sections of the transition duct vary less than five percent per millimeter from an adjacent cross-section of the transition duct along the length of the transition duct from the inlet cross-section to the outlet cross-section; (8) the unitary housing comprises a single continuous piece of plastic; and (9) the inlet cross-section of the transition duct has a curvilinear trapezoidal shape with a curved upper wall, a linear bottom wall and a pair of parallel linear sidewalls with the linear sidewalls of the pair of parallel linear sidewalls extending between and connecting the curved upper wall and the linear bottom wall and with the linear bottom wall oriented perpendicular to the pair of parallel linear sidewalls.

10. The method of claim 9, wherein the additive process comprises at least one of fused deposition modeling, selective laser sintering, stereolithography, and digital light processing.

11. The method of claim 9, further comprising mounting a cover plate to the unitary housing such that the cover plate is positioned over the volute of the unitary housing and the inlet cross-section of the transition duct after said step of successively forming.

12. The method of claim 11, wherein the housing is constructed of plastic and the cover plate is constructed of metal.

13. The method of claim 9, wherein the outlet cross-section has a circular shape or a rectangular shape.

14. The method of claim 9, wherein the transition duct defines an inner radius of curvature and an outer radius of curvature between the inlet cross-section to the outlet cross-section after said step of successively forming, the inner radius of curvature being at least two inches and the outer radius of curvature being at least four inches.

15. The method of claim 14, wherein the inner radius of curvature is at least four inches and the outer radius of curvature is at least eight inches.

16. The method of claim 9, wherein the transition duct continuously varies from the inlet cross-section to the outlet cross-section along the length of the transition duct such that each cross-section of the transition duct along the length of the transition duct is dissimilar to an adjacent cross-section of the transition duct after said step of successively forming.

17. The method of claim 9, wherein the unitary housing comprises a single continuous piece of plastic after said step of successively forming.

\* \* \* \* \*